3,197,507
SUBSTITUTED 3-p-FLUOROBENZOYLPROPYL-
PHENYLALKYLAMINES AND METHOD FOR
MAKING THE SAME
Meier E. Freed and Scott J. Childress, Philadelphia, Pa.,
assignors to American Home Products Corporation,
New York, N.Y., a corporation of Delaware
No Drawing. Filed Mar. 21, 1963, Ser. No. 266,805
7 Claims. (Cl. 260—570.5)

This invention relates to certain novel compounds useful as central nervous system depressants.

More particularly, this invention is concerned with novel substituted 3-p-fluorobenzoylpropyl - phenylalkylamines in which the amino function bears a β-phenethyl or a benzyl group.

The compounds made available by the present invention are defined by the following formula:

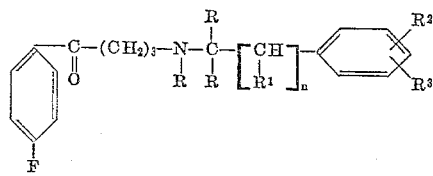

wherein n may be zero or one;
R is hydrogen or lower alkyl, preferably methyl;
$R^1$ is hydrogen or hydroxyl;
$R^2$, $R^3$ are hydrogen; lower alkoxy such as methoxy, or lower alkyl, preferably methyl.

The compounds defined above are basic in nature and readily form solid acid addition salts with organic and inorganic acids such as hydrochloric acid, sulfuric acid, acetic acid, fumaric acid and the like.

The compounds of the invention are prepared by an alkylation reaction between certain known 4-halo-p-fluoro-butyrophenones of the formula:

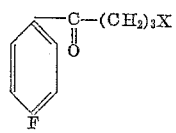

wherein X is chlorine, iodine or bromine, and an aralkylamine of the formula:

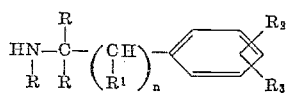

wherein R, $R^1$, $R_2$, $R_3$ and n have the meanings above stated. This reaction is carried out in an inert solvent such as toluene, benzene or xylene, preferably in the presence of a catalytic amount of a catalyst such as potassium iodide or sodium iodide. The temperature range for this reaction is from about 90 to 130° C., with the optimum temperature being the boiling point of the selected solvent. The time needed to complete the reaction varies with different reactants, the solvent used and the temperature at which it is carried out but generally ranges from 16 to 24 hours.

In the practice of the invention, the starting products are reacted by heating as above described and upon completion of the reaction, the reaction mixture is cooled in ice. Cooling the mixture causes a precipitate to form which is filtered off. The filtrate is washed with water and extracted with dilute hydrochloric acid. The aqueous layer is then washed with ether, made basic and extracted with ether. The extract is washed with salt water and dried. The crude product is then purified by distillation under reduced pressure. The basic product then can be converted to an acid addition salt with, for example, an ethanol solution of hydrogen chloride.

The following examples in which all temperatures are in degrees centigrade illustrate the best mode of carrying out the invention.

Example 1

A solution of N,α,α-trimethylphenethylamine (16.3 grams, 0.1 mole) and 4-chloro-p-fluorobutyrophenone (10 grams, 0.05 mole) in 100 ml. of toluene was refluxed for 16 hours, and then cooled in an ice-bath. The precipitate was removed by filtration. The filtrate was washed with water once. The toluene layer was then extracted with 10% aqueous hydrochloric acid (3 x 25 ml.). The aqueous layer was washed with ether, then made basic and extracted with ether. The extract was washed with saline and dried over sodium sulfate. After filtration the solvent was removed and the residue distilled under vacuum. The product, N-(3-p-fluorobenzoyl-propyl) - N,α,α - trimethylphenethylamine, distilled at 180°/.2 mm. This was converted to a hydrochloride salt with an ethanolic solution of hydrogen chloride and precipitated by the addition of dry ether. This was filtered, washed with ether, and dried. Its M.P. was 193–194°.

Analytical.—Calcd. for $C_{21}H_{27}ClFNO$: C, 69.19; H, 7.50; N, 3.85; Cl, 9.74. Found: C, 68.90; H, 7.44; N, 4.00; Cl, 9.85.

Example 2

A solution of 6.6 grams 4-chloro-p-fluorobutyrophenone, 13 grams of N-methyl-3,4-dimethoxyphenethylamine, and potassium iodide (0.2 gram) in 100 ml. of toluene was heated at 90–100° for 24 hours. The mixture was worked up in the manner of Example 1. The product, N-methyl-N-(3-p - fluorobenzolpropyl) - 3,4 - dimethoxyphenethylamine, distilled at 190–195°/2 mm. The hydrochloride salt, prepared and crystallized from ethanol, had an M.P. of 148–149°.

Analytical—Calcd. for $C_{21}H_{27}ClFNO$: C, 63.80; H, 6.88; N, 3.54; Cl, 8.96. Found: C, 64.07; H, 6.80; N, 3.66; Cl, 9.1.

Example 3

A solution of N-methylbenzlamine (12.1 grams, 0.1 mole), 4-chloro-p-fluorobutgrophenone (10 grams, 0.005 mole), and 0.2 gram KI in 100 ml. of toluene was heated under reflux for 12 hours. After cooling the precipitate of N-methylbenzylamine hydrochloride was filtered off and washed with dry ether. The filtrate was washed first with water, then extracted well with 10% hydrochloric acid. An oil appeared which was insoluble in both toluene and aqueous acid. The oil layer and the aqueous phase were separated from the toluene and washed with ether. The oil and the aqueous acid were treated with aqueous sodium hydroxide and the product extracted into ether. This was washed with saline, dried, and after removing the solvent, the residue was distilled, giving a product of N-(3-p-fluorobenzoylpropyl)-N-methylbenzylamine, B.P. 165–70°/0.2 mm. The hydrochloric acid salt was prepared by treatment of an alcoholic solution with alcoholic HCl and precipitated with ether. After recrystallization, the product melted 152–154° C.

Analytical—Calcd. for $C_{18}H_{21}ClFNO$: C, 67.10; H, 6.58; N, 4.35; Cl, 11.02. Found: C, 67.35; H, 6.57; N, 4.39; Cl, 11.15.

Example 4

A solution of (—)-ephedrine (18.3 grams, 0.1 mole), 4-chloro-p-fluorobutyrophenone (10 grams, 0.05 mole), and KI (0.2 gram) in 100 ml. of toluene was heated under reflux for 12 hours and treated in the manner of Example 1. Distillation gave the product N-(3-p-fluorobenzolpropyl)-N-α-dimethyl-β-hydroxyphenethylamine, B.P. 160–165/.03 mm. Its hydrochloride had an M.P. of 196–198° after recrystallization (from ethanol).

*Analytical*—Calcd. for $C_{20}H_{25}ClFNO$: C, 65.70; H, 6.89; N, 3.83; Cl, 9.69. Found: C, 65.72; H, 6.75; N, 3.62; Cl, 10.00.

Example 5

A solution of 14.9 grams (0.1 mole) of N,α-dimethylphenethylamine, 10 grams (0.05 moles) of 4-chloro-p-fluorobutyrophenone, and 0.2 gram of KI in 100 ml. of toluene was heated under reflux for 12 hours. The reaction mixture was cooled and treated as in Example 1. The product, N-(3-p-fluorobenzolypropyl)-N,α-dimethylphenethylamine, was distilled at 134–136°/.1 mm. The hydrochloride salt had M.P. 133–135° after recrystallization (from isopropanol-ether).

*Analysis*—Calcd. for $C_{20}H_{25}ClFNO$: C, 68.7; H, 7.21; N, 4.01; Cl, 10.1. Found: C, 68.62; H, 7.29; N, 4.19; Cl, 10.1.

Example 6

N-(3-p-fluorobenzoylpropyl)-N,α,α-trimethyl-p-tolylethylamine is prepared from 4-bromo-p-fluorobutyrophenone and N,α,α-trimethyl-p-tolylethylamine using the method of Example 1.

The compounds of this invention can be administered in a wide variety of oral or parenteral unit dosage forms, singly, or in admixture with other active compounds. The average daily dose for these compounds ranges from about 10 mg. to about 200 mg. per kilogram of body weight.

The present invention therefor also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:

1. A compound selected from the group of compounds having the formula:

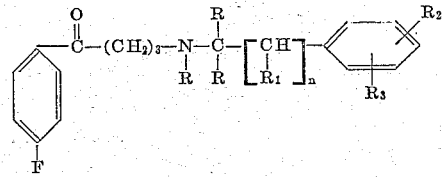

wherein $n$ ranges from 0 to 1, R is selected from the group consisting of hydrogen and lower alkyl; $R_1$ is selected from the group consisting of hydrogen and hydroxyl; $R_2$ and $R_3$ are selected from the group consisting of hydrogen, lower alkoxyl and lower alkyl and the acid addition salts thereof.

2. N-(3-p-fluorobenzoylpropyl) - N, - α,α-trimethylphenethylamine.

3. N-methyl-N-(3 - p - fluorobenzoylpropyl) - 3,4 - dimethoxyphenethylamine.

4. N-(3-p-fluorobenzoylpropyl)-N-methylbenzylamine.

5. N-(3-p-fluorobenzoylpropyl)-N,α-dimethyl - β - hydroxyphenethylamine.

6. N-(3-p - fluorobenzoylpropyl) - N,α - dimethylphenethylamine.

7. N-(3-p - fluorobenzoylpropyl) - N,α,α - trimethyl-p-tolylethylamine.

References Cited by the Examiner
UNITED STATES PATENTS

| | | | |
|---|---|---|---|
| 2,900,415 | 8/59 | Biel | 260—570.6 |
| 3,082,255 | 3/63 | Stevens et al. | 260—570.5 |
| 3,106,578 | 10/63 | Kaiser et al. | 260—570.5 |

OTHER REFERENCES

Lutz et al.: "Jour. of Organic Chemistry," vol. 12, pages 617–54.

CHARLES B. PARKER, *Primary Examiner.*
IRVING MARCUS, *Examiner.*